Nov. 7, 1950     H. J. MONNIK ET AL     2,528,537
SYSTEM ELECTRICALLY RESPONSIVE TO CHANGE
IN LEVEL OF MATERIAL IN A RECEPTACLE
Filed Jan. 2, 1947     2 Sheets-Sheet 1
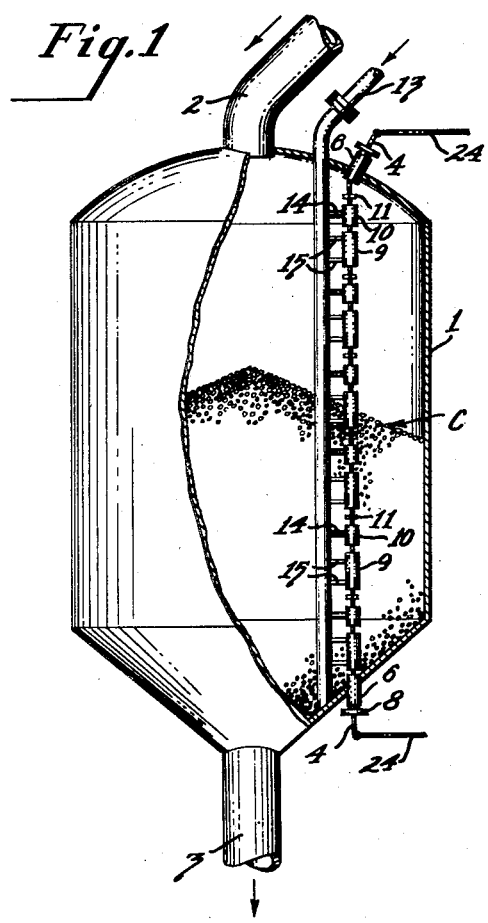
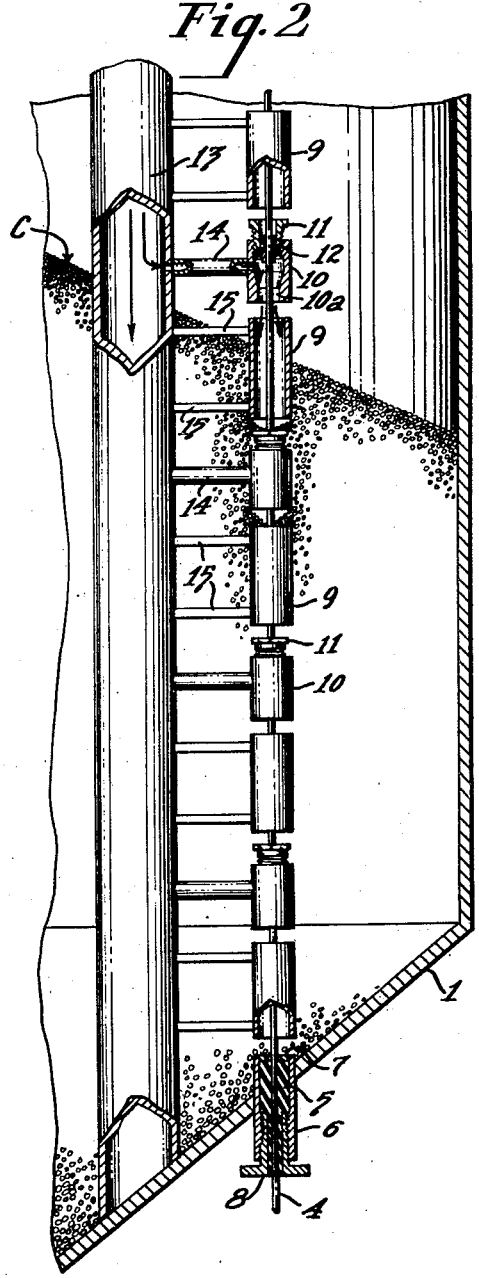
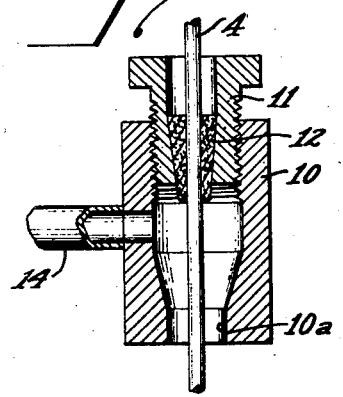
INVENTORS.
Harmon J. Monnik &
Harold H. Eickhoff
BY
Gordon A. Kessler
ATTORNEY.

Nov. 7, 1950 H. J. MONNIK ET AL 2,528,537
SYSTEM ELECTRICALLY RESPONSIVE TO CHANGE
IN LEVEL OF MATERIAL IN A RECEPTACLE
Filed Jan. 2, 1947 2 Sheets-Sheet 2

INVENTORS.
Harmon J. Monnik &
Harold H. Eickhoff
BY
Gordon A. Kessler
ATTORNEY.

Patented Nov. 7, 1950

2,528,537

UNITED STATES PATENT OFFICE 2,528,537

SYSTEM ELECTRICALLY RESPONSIVE TO CHANGE IN LEVEL OF MATERIAL IN A RECEPTACLE

Harmon J. Monnik, Narberth, and Harold H. Eickhoff, Philadelphia, Pa., assignors to Houdry Process Corporation, Wilmington, Del., a corporation of Delaware Application January 2, 1947, Serial No. 719,730

11 Claims. (Cl. 214—17)

1

This invention relates to systems electrically responsive to change in level, in a receptacle, hopper, or equivalent, of material which may be pellets, granules, fragments or particles of solid material or which may be material of liquid character.

When conducting some operations, chemical or otherwise, it becomes necessary to pass material of the character described along a path which includes a receptacle or hopper wherein such material accumulates in a variable manner. In order to avoid excessive or insufficient accumulation of the described material in the aforesaid receptacle, there is associated therewith, in accordance with the invention, an electrical conductor which is subjected to electrical resistance variation when the level of the upper surface of the material changes and, responsive to such resistance variation, an indicating or control function is obtained so that accumulation of material in the receptacle is caused to proceed in a more normal or satisfactory manner.

More particularly, in accordance with the invention, the aforesaid electrical conductor is positioned generally vertically in the receptacle so that the upper and lower portions thereof, which are disposed, respectively, above and below the upper surface of the material, are maintained at different temperatures, respectively. Accordingly, when the level of the upper surface of the material changes, the temperature relation between the upper and lower conductor portions is varied and this causes the desired change in electrical resistance of the entire conductor.

The invention has further reference to a conduit system for passing a stream of gases into heat-transferring relation with said upper conductor portion, these gases having temperature differing substantially from that of the material into which said lower conductor portion extends and, hence, maintaining the temperature of the upper conductor portion substantially different from that of the lower conductor portion.

Various other objects and advantages of the invention will become apparent from the following detailed description.

For an understanding of the invention and for an illustration of one of the forms thereof, reference is to be had to the accompanying drawings, in which:

Fig. 1 is an elevational view, partly in section, showing a receptacle having associated therewith the electrical conductor arrangement of the invention;

Fig. 2 is an enlarged elevational view, partly in section, showing a part of the arrangement illustrated in Fig. 1;

Fig. 3 is an enlarged sectional view, partly in

Figures 4, 5:
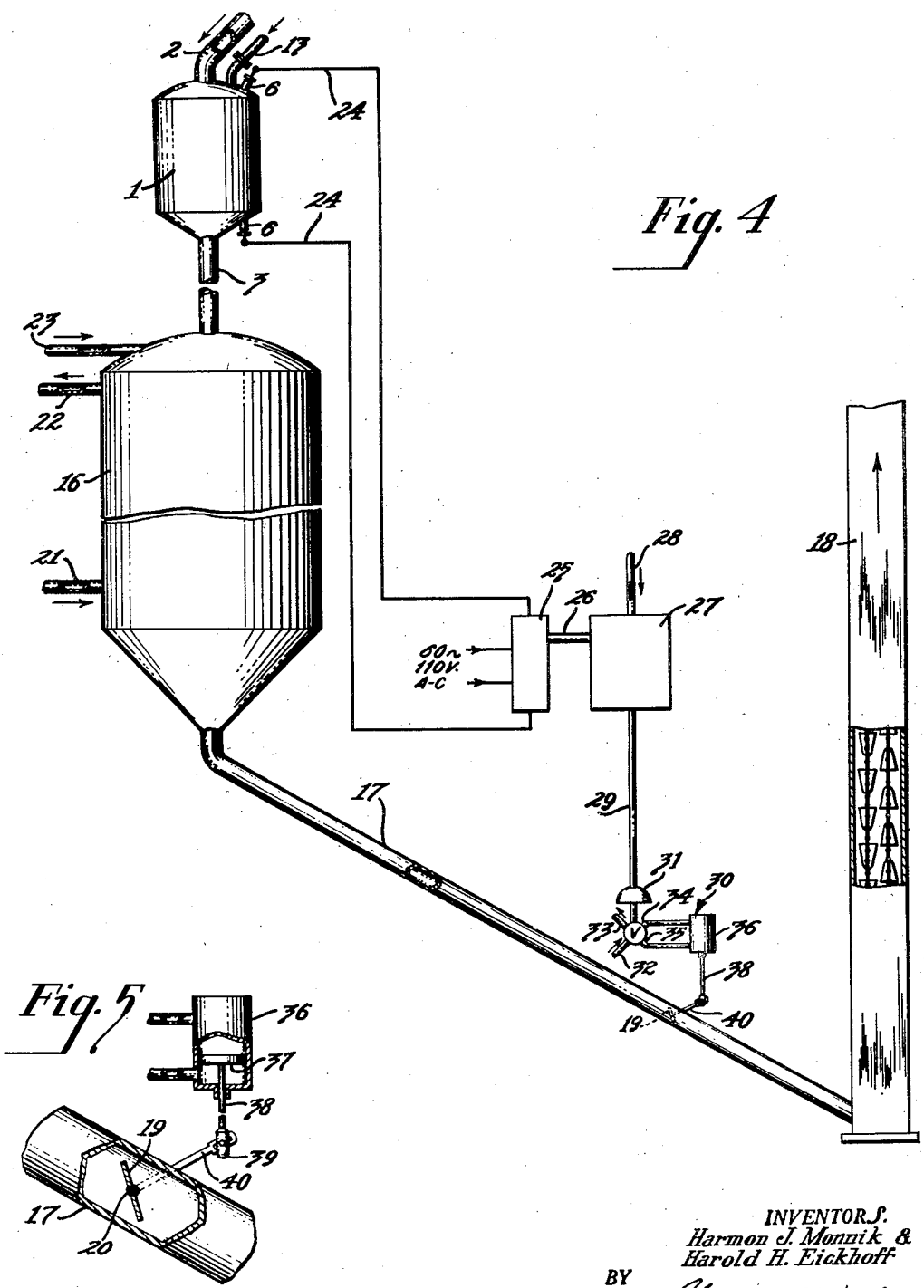

2 elevation, showing a detailed feature of the invention;

Fig. 4 is a diagrammatic view illustrating a control system; and

Fig. 5 is an enlarged elevational view, partly broken away, showing a piston arrangement for changing the position of a valve member.

In this specification, the invention is described with respect to a present preferred application thereof wherein the material referred to above is of the character known as "contact material" which, ordinarily, is utilizable as a catalyst in connection with the conversion of hydrocarbons. This contact material may be of any suitable character such, for example, as activated clay pellets, synthetic silica-alumina pellets or beads, etc., these pellets or beads having suitable major dimensions such as between $\frac{1}{16}$ and $\frac{3}{4}$ of an inch.

Referring to Figs. 1 and 2, there is shown a suitable metallic hopper or receptacle 1 adapted to contain contact material C, the upper surface of which may be elevated or lowered in the manner hereinafter described. In the form of the invention herein shown, contact material is delivered to the hopper 1 through an upper inlet conduit 2 and passes therefrom by way of a lower outlet conduit 3.

As hereinafter described, the outlet conduit 3 conducts the contact material to a reaction housing and, for various known reasons relating to surge capacity of the system, maintenance of an inert gas seal in said outlet conduit 3, etc., it is necessary for the hopper 1 to be continuously maintained at least partially filled with contact material. Therefore, in accordance with the invention, an electrical effect is produced which is responsive to variations in the level of the upper surface of the contact material and this effect is utilized in suitable manner, as by control of the rate of flow of the contact material through the conduit 3, in order to maintain a sufficient amount thereof in the hopper 1. As will be noted, the upper surface of the contact material in said hopper 1, instead of being horizontal, is defined by the angle of repose of said contact material.

Referring further to Figs. 1 and 2, the aforesaid hopper 1 is shown as having an electrical conductor 4 disposed vertically therein, opposite respective ends of said conductor 4 extending through the upper and lower wall surfaces of the hopper 1 in sealed, insulated relation with respect thereto. Thus, as shown in Fig. 2, the lower end of conductor 4 may extend through a passage-forming member 5 formed from suitable electricity-insulating material. The member 5 is disposed within a sleeve 6 suitably secured in an aperture formed in the lower wall surface of the hopper 1, one end of the member 5 engaging a flanged surface 7 of the sleeve 6 against which it is held by a plug 8 threaded to said sleeve 6. As will be understood, a duplicate arrangement of the character described above may be utilized for associating the upper end of the conductor 4 with the upper surface of the hopper 1.

The conductor 4 may be formed from a selected material such as platinum, nickel alloy or equivalent, materials of this character being corrosion-resistant to a desired extent when engaged by heated material in the hopper 1.

It is a feature of the invention that the electrical resistance of the aforesaid conductor 4 is the electrical effect which varies in response to change in temperature thereof as and when the level of the upper surface of the contact material in the hopper 1 changes in response to change in the quantity thereof in said hopper 1 as aforesaid. As hereinafter described, the temperature of the contact material in the hopper 1 is substantially the same as the temperature of the gases in the overlying gas space and, therefore, change in the level of the contact material alone is incapable of effecting change in temperature of the conductor 4 for the purpose stated. In accordance with the invention, an arrangement is provided for causing the temperature of the conductor portion in the gas space to differ to marked extent from that of the conductor portion in the contact material. Accordingly, as the respective lengths of said conductor portions change in response to change in level of the contact material, a differential effect is obtained which causes a significant variation in the electrical resistance of the electrical conductor 4.

For the purpose noted above, an arrangement is provided wherein the aforesaid conductor 4 extends longitudinally through pipe sections 9, 10 related alternately to each other and disposed in spaced, end-to-end relation. As shown particularly in Fig. 3, the upper portion of the passage defined by each pipe section 10 may be interiorly threaded for the reception of the threaded shank of a sleeve 11 in part defining a tapered passage which receives a tapered plug 12 formed from suitable electricity-insulating material. Each plug 12 defines a central longitudinal passage through which the conductor 4 extends. As will be understood, the plugs 12 maintain the conductor 4 in desired spaced relation with respect to all of the pipe sections 9 and 10. With an arrangement of the character described, the upper portion of each pipe section 10 is closed or substantially sealed and, further, it is desirable, for a purpose hereinafter to be described, for the lower portion of the passage defined by each pipe section 10 to be restricted to some extent as indicated at 10a.

A pipe or conduit 13, which preferably is treated or constructed to provide a relatively low rate of heat transfer, is disposed interiorly of the hopper 1 preferably in parallel relation with respect to the conductor 4. Extending transversely from and carried by the conduit 13 are spaced tubes 14 and spaced pairs of rods or bars 15. Each tube 14 supports one of the aforesaid pipe sections 10 and defines a passage leading from the interior of the conduit 9 to the associated pipe section 10. Further, each pair of the rods 15 supports one of the aforesaid pipe sections 9.

As shown in Fig. 2, the lower end of the conduit 13 should be closed or sealed in suitable manner. The upper end of the conduit 13 extends through the top wall of the hopper 1 and, for a reason hereinafter to be described, is connected to a supply source, not shown, of a gaseous medium which is admitted to the hopper 1 by said conduit 13.

Referring to Fig. 4, the hereinbefore described conduit 2 may be traversed by contact material which is supplied thereto by an elevator, not shown, after said contact material has been subjected to a regenerating operation as known in the art. As stated, the contact material enters the hopper 1 by way of the conduit 2 and passes therefrom by way of the conduit 3.

A housing 16 defining a reaction zone receives the contact material from the conduit 3 and, in said housing 16, the contact material gravitates to the lower end thereof for subsequent passage through a conduit 17 leading to the lower end of an elevator 18 utilizable for lifting the contact material to a level from which it passes under the influence of gravity to the regenerating zone, not shown. As illustrated in Figs. 4 and 5, a valve member 19, carried by a suitably journalled shaft 20 is disposed interiorly of the conduit 17 for controlling the rate at which the contact material passes therethrough.

By reason of the fact that the contact material moves, under the influence of gravity, as a solid bed of material from the hopper 1, through the conduit 3, the reaction housing 16 and finally through the conduit 17, it results that the position of the valve member 19 regulates the movement of the contact material through the entire system referred to immediately above. More particularly, the position of said valve member 19 regulates the rate of departure of the contact material from the hopper 1 by way of the outlet conduit 3 and thereby controls the quantity and upper level thereof in the hopper.

Hydrocarbon vapors to be cracked or otherwise converted may be admitted to the housing 16 by a line 21 for passage therethrough countercurrent as regards the descending contact material, the reaction proceeding under positive pressure conditions as known, and the converted products being disengaged from the contact material and passed from said housing 16 by way of a line 22. Alternatively, if desired, the operation may be the reverse of that described above in the sense that hydrocarbon material passes through the housing 1, during the conversion process, concurrent as regards the contact material. In order to prevent passage of hydrocarbon vapors from the reaction zone upwardly through the conduit 3, a suitable sealing medium, such as a stream of flue gases, is admitted to the system above said reaction zone and, to this end, a line 23 may be connected in known manner to the upper portion of the housing 16. These flue gases pass upwardly into the hopper 1 and occupy the space above the contact material at a temperature substantially the same as that of said contact material.

Referring particularly to Fig. 1, the hereinbefore described conduit 13 is connected to a source of gases, not shown, which are inert as regards the solid and gaseous material in the hopper 1. With the form of the invention herein disclosed, the inert gases which are thus supplied to the conduit 13 preferably are flue gases and the temperature thereof should be substantially higher or lower, preferably the latter, than the substantially constant temperature condition which exists in the hopper 1. Further, such gases should be supplied to the conduit 13 at a pressure which exceeds that obtaining in said hopper 1.

Ordinarily, the contact material arrives in the hopper 1 at a temperature which may range between 800° F. and 1000° F. As stated, the temperature of the gases supplied to the conduit 13, preferably, is lower than that of the contact material and, if so, it is desirable for the temperature to be substantially lower, as of the order of about 250° F. lower than the temperature existing in the hopper 1. Below this level, the temperature of the gases supplied to said conduit 13 may range downwardly to such extent as may be desirable as, for example, to about 60° F. if desired.

As stated above, each pipe section 19 is connected to the conduit 13 by a tube 14. As regards those pipe sections 9 and 10 which are above the upper surface of the contact material C, the action is as follows: There is a free path of communication from each pipe section 10 to the adjacent lower pipe section 9 and from the lower end of each pipe section 9 to the interior gas space of the hopper 1. Accordingly, the gases from each tube 14 pass into the chamber defined by each pipe section 10 and are directed downwardly so that a substantial or large part thereof enter the adjacent lower pipe section 9 through which they pass to and from the lower end thereof, this action being enhanced by the nozzle effect existing at the restricted lower end 10a of each pipe section 10. Accordingly, from each pipe section 10 last named, a stream of gases is directed along the conductor 4 and these gases, by reason of the fact that the temperature thereof is substantially different from the substantially uniform temperature existing interiorly of the hopper 1, cause the temperature of that portion of conductor 4 above the upper surface of the contact material to depart from the interior hopper temperature and approach, to substantial extent, the temperature of the streams of gases traversing the pipe sections 9 and 10.

As regards those pipe sections 9 and 10 which are below the upper surface of the contact material C, the action is as follows: As clearly appears from Fig. 2, contact material, to substantial extent, occupies the space between each pipe section 10 and the adjacent upper or lower pipe section 9. Due to the sealing effect of this contact material, there is no free path of communication (such as exists above the contact material) from each pipe section 10 to the adjacent lower pipe section 9 and from the lower end of each pipe section 9. Accordingly, the passage of gases from each tube 14 is restricted by the described sealing action of the contact material with the result that there is little if any change in temperature of that portion of conductor 4 below the upper surface of the contact material. Obviously, the described sealing action of the contact material is not perfect and, therefore, there is some passage of gases into each pipe section 10 by way of the associated tube 14. However, this is insufficient to cause any substantial departure in temperature of the last named conductor portion from that of the contact material.

In view of the foregoing, it follows, then, that the temperature of the portion of conductor 4 above the contact material differs substantially from the temperature of the conductor portion below the contact material. While the level of the contact material remains unchanged, the lengths of the respective conductor portions remain unchanged and the same holds true as regards to electrical resistance of the entire conductor 4.

However, should the level of the contact material rise, to any substantial extent, it follows, depending on the extent of such rise, that one or more of the spaces between the pipe sections 9 and 10 is or are sealed by contact material in the manner described above. When this happens, the length of the conductor portion which is controlled in temperature by the contact material increases whereas the length of the conductor portion which is controlled in temperature by the gases from the conduit 13 decreases. As a result, the electrical resistance of the entire conductor 4 is changed in one sense. Conversely, should the level of the contact material be lowered to any substantial extent, the electrical resistance of said conductor 4 is changed in reverse sense.

In accordance with the invention, change in electrical resistance of the conductor 4 resulting from change in level of the contact material in the hopper 1 is utilized to vary an electrical effect, such as the magnitude of the electrical current traversing said conductor 4 in order to obtain a resulting control, indicating or such other function as may be desirable.

Thus, for example, the ends of the aforesaid conductor 4 may have connected thereto the respective conductors 24 which extend to any suitable electronic balancing control unit 25 as shown, for example, on page 9 of Personnel Instruction 1-12-5a, a publication of The Foxboro Company, Foxboro, Massachusetts. As illustrated, sixty cycle, 110 volt, alternating current is delivered to this unit and it is current from this source that traverses the resistance conductor 4. The unit 25 operates a shaft 26 which, in turn, operates a suitable controller 27 such, for example, as The Model 40 Automatic Controller described in Bulletin No. 381 of the aforesaid Foxboro Company. The aforesaid control unit and controller are shown as a combined device in Fig. 9678, page 6, Bulletin No. 397 of said Foxboro Company.

By a conduit 28, instrument air at suitable pressure is delivered to the controller 27 and, in a conduit 29 leading therefrom, the pressure of a column of air is varied in accordance with the operation or position of the mechanism in controller 27 as determined by movement of shaft 26.

The conduit 29 leads to any suitable regulator 30 such, for example, as described in Bulletin DR-24 of the Hagan Corporation, Pittsburgh, Pennsylvania. In the regulator 30, the air pressure in the conduit 29 is applied to the top surface of a diaphragm, not shown, in a housing 31, said diaphragm being utilizable for controlling the position of a valve having four ports 32, 33, 34 and 35. A source of supply of power air is connected to the port 32 whereas the port 33 leads to the atmosphere. The ports 34 and 35 are connected, respectively, to the upper and lower sides of a cylinder 36 having a piston 37 disposed therein for reciprocatory movement. By the aforesaid diaphragm, the described valve is operated to cause the position of the piston 37 to change in accordance with variations in the air pressure in the conduit 29.

The piston 37 has secured thereto a rod 38 which may terminate in a clevis 39 connected by a pin-and-slot connection to one end of a lever 40 which, at its other end, is secured, exteriorly of the conduit 17 to one end of the above described shaft 20 which carries the valve member 19.

On operation, variation in electrical resistance of the conductor 4 resulting from change of level in the contact material occupying the hopper 1 causes corresponding variation in the magnitude of the current traversing the circuit comprising the conductors 24. This, in turn, is reflected in movement of the shaft 26 which positions the controller 27 to cause corresponding variation in the pressure of the column of air in the conduit 29. By the regulator 30, the position of the piston 37 is changed in accordance with variations in the pressure of the column of air in the conduit 29 and, due to the described mechanical connection, the valve member 19 follows the movement of said piston 37.

Should the level of the contact material in the hopper 1 rise to any substantial extent, the electrical resistance of the conductor 4 is changed in one sense and this change, as reflected through the described control system, causes the valve member 19 to open to greater extent and thereby increase the rate of flow of contact material through the conduit 17 with consequent lowering of the level of contact material in the hopper 1. Should the level of the contact material in said hopper 1 decrease to any substantial extent, the electrical resistance of the conductor 4 is changed in a sense the reverse of that described immediately above with consequent closure of the valve member 19 to some extent, this operation causing the level of the contact material in the hopper 1 to rise.

It shall be understood that the control system herein illustrated and described as extending from the conductor 4 to the valve member 19 is intended to be representative of any suitable control system which may thus be utilized. Thus, for example, and in lieu of the described system, the position of valve member 19 may be controlled by an electric motor which, in turn, is actuated by an electric current varying in accordance with the magnitude of an electrical effect, such as the current traversing the conductors 24.

Alternatively, if desired, the control system may be omitted in favor of a simple Wheatstone bridge or other equivalent measuring circuit by which an indication is obtained concerning the change of resistance of conductor 4 in response to change in level of the contact material in the hopper 1. Such arrangement is shown in the patent to Duhme No. 1,942,241. With indicating arrangements of this character, it will be understood that the operator may obtain a visual indication which designates the level of the contact material in said hopper 1 and, by a manual act, change the position of the valve member 19 in accordance therewith.

It shall be understood that the invention is not to be limited to the present preferred application thereof involving control of level of contact material in the hopper 1 prior to passage to a reaction zone. Thus, for example, by the present invention involving use of an electrical conductor 4, contact material may be maintained at a desired level in a regenerating housing or other reaction housing.

Still further, it is to be understood that the invention is not to be limited to operations involving control in the level of contact material utilizable for the conversion of hydrocarbons. As well, the level of other non-conductive fragmentary or pulverant solid material in a receptacle or tank may be controlled in accordance with the present invention. Likewise, the level of liquid material, provided that it is suitably non-conductive as regards electricity, may be controlled by varying the resistance of an electrical conductor such as the conductor 4 described. Still further, it shall be understood that the invention may be practiced when the level-varying material in the receptacle or tank is a conductor of electricity. If so, the conductor 4 or equivalent should have associated therewith suitable electricity-insulating means which, however, should be a good thermal conductor.

In view of the foregoing description, it will be understood, that, should the temperature of the gases in the space overlying the material, the level of which is to be controlled, be substantially different from the temperature of such material, the arrangement herein disclosed as comprising the pipe sections 9 and 10, the conduit 13 and associated apparatus may be omitted. If so, the desired change in resistance of the conductor 4, in response to changing material levels, is obtained without utilization of the stream of temperature-changing gases supplied by the conduit 13.

Obviously many modifications and variations of the invention as hereinbefore set forth may be made without departing from the spirit and scope thereof and therefore only such limitations should be imposed as are indicated in the appended claims.

We claim:

1. Mechanism responsive to change in level of material disposed in a receptacle and having substantial resistance to the passage of electricity, said mechanism comprising an electrical conductor positioned vertically in said receptacle and having upper and lower portions disposed, respectively, above and below the aforesaid level, and means for passing a stream of gases into heat-transferring relation with respect to the upper conductor portion, said stream of gases having temperature differing substantially from that of said material.

2. Mechanism responsive to change in level of material disposed in a receptacle and having substantial resistance to the passage of electricity, said mechanism comprising an electrical conductor positioned vertically in said receptacle and having upper and lower portions disposed, respectively, above and below the aforesaid level, means for passing a stream of gases into heat-transferring relation with respect to the upper conductor portion, said stream of gases having temperature substantially lower than that of said material, said means comprising a conduit disposed adjacent said conductor, spaced pipe sections disposed around said conductor and extending longitudinally thereof, and tubes leading, respectively, from said conduit to some of said pipe sections.

3. In a system comprising a hopper, inlet and outlet conduits therefor, a housing defining a reaction zone connected to said outlet conduit, a discharge conduit from said housing, the arrangement being such that regenerated contact material at elevated temperature gravitates through said inlet conduit, said hopper, said outlet conduit, said housing and said discharge conduit, and a valve in said discharge conduit for controlling the rate of movement of the contact material through said system and the level of the upper surface thereof in said hopper, the conbination with an electrical conductor positioned vertically in said hopper and subjected to resistance variation when the aforesaid level changes to thereby change the length of the conductor receiving heat from the contact material, and means responsive to the specified resistance variation of said conductor for controlling the position of said valve.

4. In combination, an electrical conductor positioned vertically in a receptacle and having its ends terminating exteriorly thereof, means forming sealed joints with said conductor where it extends through upper and lower wall surfaces of said receptacle, and means for passing a stream of gases into heat-transferring relation with respect to at least a portion of the conductor within said receptacle, said stream of gases having temperature differing substantially from that of the ambient gas space.

5. In combination, an electrical conductor positioned vertically in a receptacle and having its ends terminating exteriorly thereof, means forming sealed joints with said conductor where it extends through upper and lower wall surfaces of said receptacle, means for passing a stream of gases into heat-transferring relation with respect to at least a portion of the conductor within said receptacle, said stream of gases having temperature substantially lower than that of the ambient gas space, said means comprising a conduit disposed adjacent said conductor, spaced pipe sections disposed around said conductor and extending longitudinally thereof, and tubes leading from said conduit to some of said pipe sections.

6. In combination, an electrical conductor positioned vertically in a receptacle and having its ends terminating exteriorly thereof, means forming sealed joints with said conductor where it extends through upper and lower wall surfaces of said receptacle, a conduit positioned vertically in said receptacle adjacent said conductor, spaced pipe sections disposed around said conductor and extending longitudinally thereof, and tubes leading, respectively, from said conduit to some of said pipe sections, said tubes supporting said pipe sections.

7. In combination, an electrical conductor positioned vertically in a receptacle and having its ends terminating exteriorly thereof, means forming sealed joints with said conductor where it extends through upper and lower wall surfaces of said receptacle, a conduit positioned vertically in said receptacle adjacent said conductor, spaced pipe sections disposed around said conductor and extending longitudinally thereof, tubes leading, respectively, from said conduit to certain of said pipe sections, said tubes supporting said certain pipe sections, a sleeve threaded into the upper end of each of said certain pipe sections, and an insulating plug carried by each sleeve for supporting said conductor.

8. In combination, an electrical conductor positioned vertically in a receptacle and having its ends terminating exteriorly thereof, means forming sealed joints with said conductor where it extends through upper and lower wall surfaces of said receptacle, a conduit positioned vertically in said receptacle adjacent said conductor, spaced pipe sections disposed around said conductor and extending longitudinally thereof, each pipe section defining a passage extending entirely therethrough, and means extending from said conduit to support said pipe sections and to provide confined paths between the latter and said conduit.

9. In combination, an electrical conductor positioned vertically in a receptacle and having its ends terminating exteriorly thereof, means forming sealed joints with said conductor where it extends through upper and lower wall surfaces of said receptacle, a conduit positioned vertically in said receptacle adjacent said conductor, a set of spaced pipe sections disposed around said conductor and extending longitudinally thereof, tubes leading, respectively, from said conduit to said pipe sections, said tubes supporting said pipe sections, a second set of spaced pipe sections disposed around said conductor and extending longitudinally thereof in alternating spaced relation with respect to the first named pipe sections, and means extending from said conduit for supporting said second set of pipe sections.

10. In combination, an electrical conductor positioned vertically in a receptacle and having its ends terminating exteriorly thereof, means forming sealed joints with said conductor where it extends through upper and lower wall surfaces of said receptacle, a conduit positioned vertically in said receptacle adjacent said conductor, a set of spaced pipe sections disposed around said conductor and extending longitudinally thereof, tubes leading, respectively, from said conduit to said pipe sections, said tubes supporting said pipe sections, a sleeve threaded into each pipe section, an insulating plug carried by each pipe section for supporting said conductor, said sleeve and plug closing the upper end of each of said pipe sections, a second set of pipe sections disposed around said conductor and extending longitudinally thereof in alternating spaced relation with respect to the first named pipe sections, each pipe section of the second set thereof last named defining a passage extending entirely therethrough, and means extending from said conduit for supporting said last named pipe sections.

11. In combination, a receptacle, a conduit through which heated material is admitted to said receptacle, a conduit through which the heated material is withdrawn from said receptacle, means for controlling the rate of withdrawal of the heated material from and the upper level thereof in said receptacle, an electrical conductor positioned in said receptacle and subjected to electrical resistance variation when the aforesaid level changes to thereby change the length of the conductor having the temperature of the specified material, and means responsive to such resistance variation of said conductor for actuating said first-named means to control the quantity of material in said receptacle.

HARMON J. MONNIK.
HAROLD H. EICKHOFF.

REFERENCES CITED

The following references are of record in the file of this patent:

UNITED STATES PATENTS

| Number | Name | Date |
|---|---|---|
| 1,942,241 | Duhme | Jan. 2, 1934 |
| 2,246,563 | Winters | June 24, 1941 |
| 2,262,070 | Turk | Nov. 11, 1941 |
| 2,382,755 | Tyson | Aug. 14, 1945 |
| 2,394,928 | Martin et al. | Feb. 12, 1946 |

FOREIGN PATENTS

| Number | Country | Date |
|---|---|---|
| 129,741 | Great Britain | July 24, 1919 |
| 513,427 | Great Britain | Oct. 12, 1939 |
| 622,247 | France | Feb. 21, 1927 |